May 29, 1962  R. L. JAESCHKE  3,036,680
ELECTROMAGNETIC COUPLINGS
Filed March 6, 1958  3 Sheets-Sheet 1

INVENTOR.
RALPH L. JAESCHKE
BY Hudson, Boughton,
Williams, David & Hoffmann
ATTORNEYS

United States Patent Office 3,036,680
Patented May 29, 1962

3,036,680
ELECTROMAGNETIC COUPLINGS
Ralph L. Jaeschke, Kenosha, Wis., assignor to Eaton Manufacturing Company, Cleveland, Ohio, a corporation of Ohio
Filed Mar. 6, 1958, Ser. No. 719,583
8 Claims. (Cl. 192—84)

This invention relates to magnetic couplings of the kind embodying an annular field unit and an associated annular armature means and, as one of its objects, provides a novel coupling of this character. The present invention also provides a novel annular pole structure as a component of such a coupling and which is of a simple form and integral type of construction adapted for low-cost manufacture.

As another achievement thereof, this invention provides an annular pole structure of an integral, that is, a one-piece construction comprising spaced pole ring portions connected by a high-reluctance annular connecting portion having openings therein in a distributed and spaced-apart relation both radially and circumferentially of such connecting portion.

This invention further provides a novel magnetic coupling having passage means for a flow of cooling air therethrough, and additionally provides such a coupling in which the cooling means is employed in association with an integral pole member having spaced pole ring portions connected by a high-reluctance connecting means.

Figure 1:
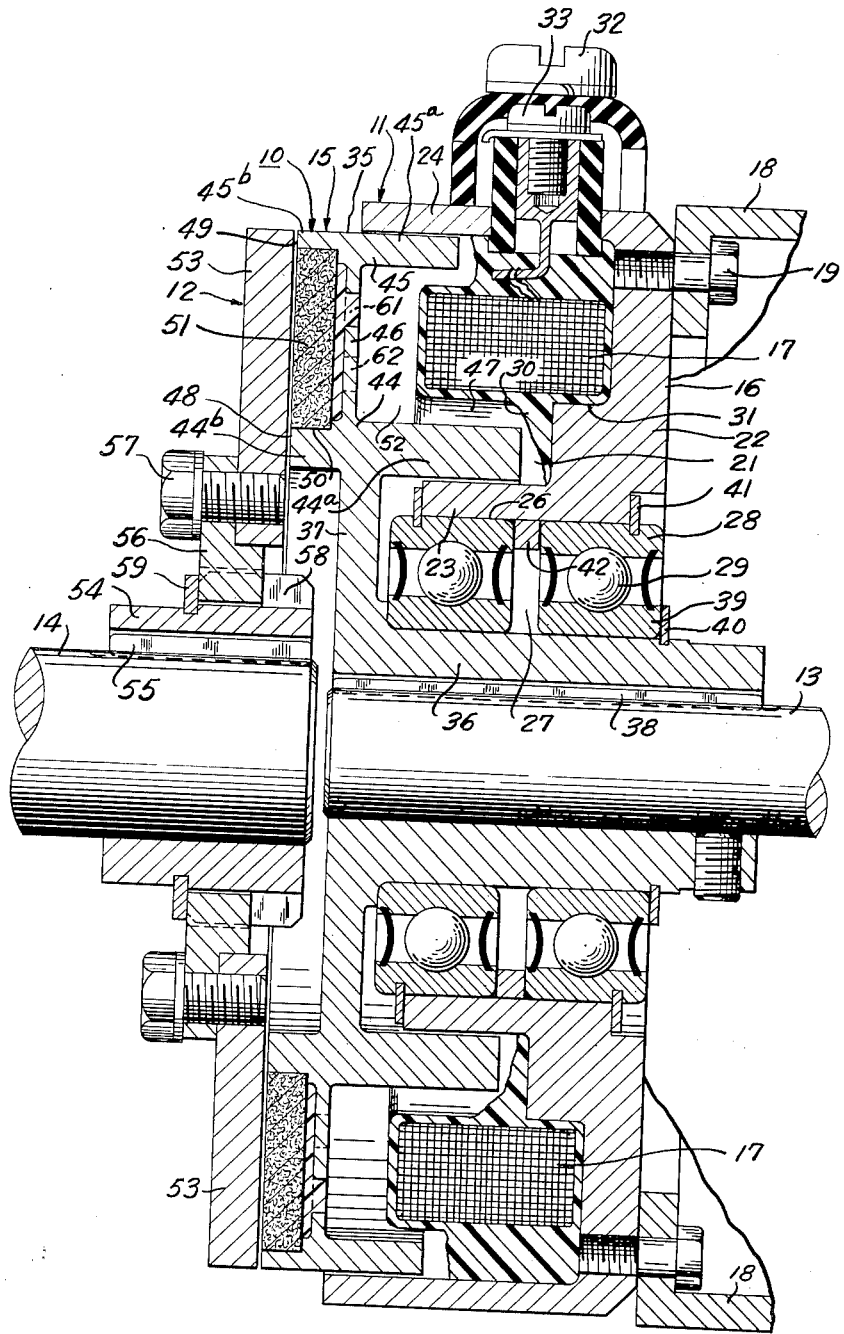
Figure 2:
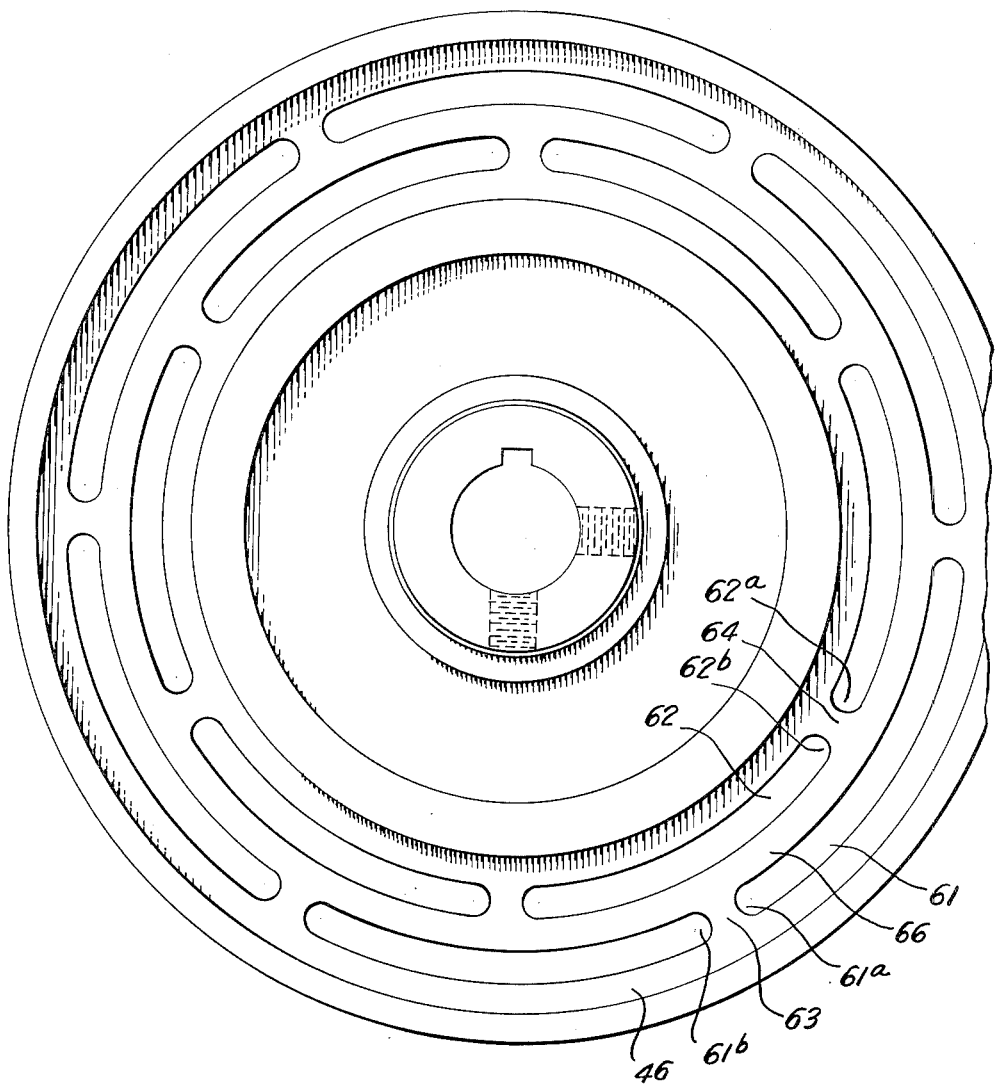
Figure 3:
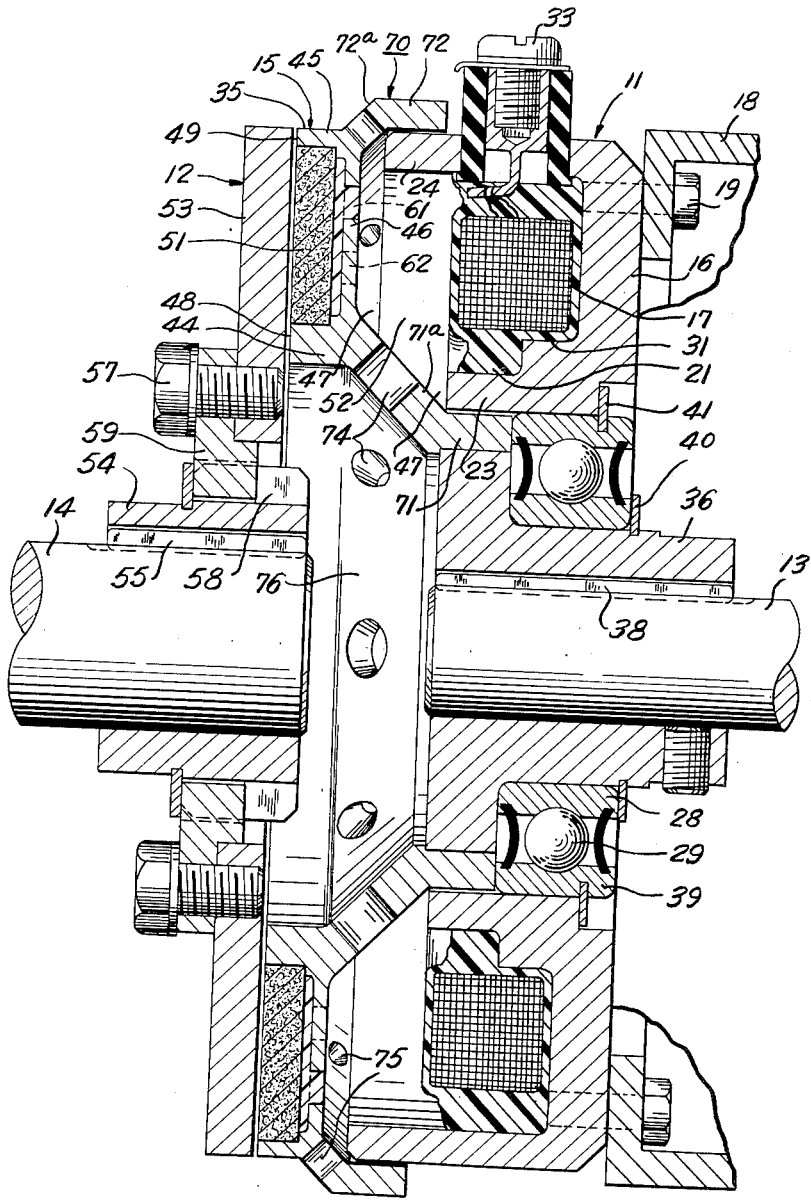

Other objects and advantages of the invention will be apparent in the following detailed description and in the accompanying drawings forming a part of this specification and in which, FIG. 1 is an axial section taken through a magnetic coupling embodying this invention;

FIG. 2 is an end elevation of the annular pole member of the device in detached relation; and FIG. 3 is an axial section similar to that of FIG. 1 but showing a modified form of magnetic coupling.

As representing one practical embodiment of this invention, FIG. 1 shows a magnetic coupling 10 which comprises, in general, an annular field unit 11 and an associated rotatable annular armature means 12. The coupling 10 also comprises relatively rotatable axially aligned shafts 13 and 14, one of which is a power input shaft and the other of which is a power output shaft.

The field unit 11 comprises a rotatable annular pole member 15, an annular core member 16, and energizing winding means 17, mounted on the latter. The pole member 15 is disposed in an axially intermediate position between the core member 16 and the armature means 12.

The core member 16 is here shown as being a stationary member attached to a supporting structure 18, as by means of suitable screws 19, and is in the form of a ring made of suitable magnetic material. The core member 16 of a substantially U-shaped cross-sectional form with an annular channel-shaped pocket or recess 21 therein in which the field winding 17 is located.

As herein shown, the core member 16 comprises an annular radial end wall 22 and inner and outer radially spaced annular walls 23 and 24 located on opposite sides of the channel recess 21 and formed as axial projections of the end wall which extend toward the armature means 12. The inner annular wall 23 extends around a central axial opening 26 of the core member 16 and forms a support sleeve for the outer races 28 of a pair of antifriction bearings 29.

The field winding 17 is an annular coil which is secured in, and insulated from, the core member 16 by suitable insulating material interposed therebetween such as the epoxy resin 30. The core member preferably has an extension groove 31 therein at the bottom of the channel recess 21 and the coil 17 is of a size to be seated in such groove. Energizing current is adapted to be supplied to the coil 17 from an available current source through terminal members 32 and 33, which are mounted in an insulated relation on the exterior of the annular wall 24 of the core member, and with which the ends of the coil are connected. When the core member 16 and the energizing coil 17 are in a stationary relation as indicated above, the energization of the coil can be accomplished without need for slip rings or brushes.

The present invention is more particularly concerned with the pole member 15 which is here shown as comprising an annular rim portion 35 supported by a central axial hollow hub 36 and connected with the latter by a radial disk portion 37. The hub 36 is secured on the shaft 13 as by means of a suitable key 38. The shaft 13 and the pole member 15 are rotatably supported by the core member 16 by means of the antifriction bearings 29 mounted in the latter. For this purpose, the hub 36 of the core member 15 is engaged in the inner races 39 of the antifriction bearings 29 and retained therein as by means of the snap ring 40. The outer races 28 of the antifriction bearings 29 are retained in assembled position in the sleeve 23 of the core member 16 by suitable retainer rings 41 and interposed spacer ring 42.

The rim portion 35 of the pole member 15 is formed by radially spaced inner and outer annular walls or pole ring portions 44 and 45 and a connecting web means or wall 46 connecting the inner and outer ring portions and extending radially and circumferentially therebetween. The annular pole member 15 is made of a suitable magnetic material and is here shown as being of a one-piece construction in which the pole ring portions 44, 45 and the web 46 are integrally connected.

The pole ring portions 44 and 45 have axially extending annular legs or flanges 44a and 45a located on one side of the radial connecting web 46 and which extend into the annular channel 21 of the core member 16 in an axially overlapping or inside telescoping relation to the inner and outer annular walls 23 and 24 of the latter. The axial flanges 44a and 45a are disposed in a relatively close-running relation to the inner surfaces of the wall portions 23 and 24 of the core member 16 so as to provide with the latter a low-reluctance magnetic path for the flux produced by the energizing coil 17.

The pole ring portions 44 and 45 also have axially extending annular legs or flanges 44b and 45b on the other side of the annular web 46 and which extend toward the armature means 12 and have annular end pole faces 48 and 49 lying in a common radial plane and presented to the armature means. The axial flanges 44b and 45b define with the connecting web 46 an annular recess 50 in which an annular body 51 of suitable nonmagnetic friction material is located for co-operation with the armature means 12 when the latter is moved to its engaged condition against the core member 15.

The axial flanges 44a and 45a define with the web 46 an annular channel 47 which faces toward, and is in communication with, the annular channel 21 of the core member 16. These two channels 21 and 47 together form an annular chamber 52 in which the coil 17 is housed. As shown in FIG. 1, the coil 17 extends only part-way into the channel recess 47 and is separated from the adjacent portions of the rotatable core member 15 by air space.

The armature means 12 is here shown as comprising a flat-ring-shaped armature member 53 made of suitable magnetic material and being of a radial width to extend in a spanning relation across the end pole faces 48 and 49 of the pole member 15. The armature means 12 also comprises a hub 54 which is secured on the shaft 14 by means of a key 55, and a carrier ring 56 on which the armature member 53 is secured as by means of the screws 57. The carrier ring 56 is splined on the hub 54 by a spline connection 58 and is axially slidable on the hub for movement of the armature member 53 to and from its engaged position. The carrier ring 56 is retained in this axially slidable relation on the hub 54 by a suitable retaining ring 59.

From the construction and arrangement of the component parts of the coupling 10, as above described, it will be seen that the core member 16 and the pole ring portions 44 and 45 co-operate to form a magnetic circuit for the flux produced by the coil 17 and that the magnetic circuit extends around the coil and through the armature member 53. It will accordingly also be understood that the armature member 53 is axially shiftable to engaged and released positions in response to energization and de-energization of the coil 17.

In accordance with the present invention, the connecting web 46 of the core member 15 is a high-reluctance connecting means constituting an integral portion of this one-piece member. The high-reluctance characteristic of the connecting web 46 is desirable and very important for minimizing the leakage or short-circuiting flow of flux therethrough as a magnetic shunt when linkage of the flux with the armature member 53 is desired. The high-reluctance characteristic of the connecting web 46 is obtained by providing this web with areas of high reluctance which interrupt the homogeneity and magnetic conductivity thereof, such areas being shown in the drawings as distributed openings which are spaced apart both circumferentially and radially thereof, so that any flux traveling from one to the other of the pole ring portions 44 and 45 through this connecting web is made to follow a relatively long and circuitous path which offers only a relatively small cross-sectional area of the magnetic material for the passage of such flux therethrough.

As shown in FIG. 2 of the drawings, the distributed and spaced-apart openings of the connecting web 46 are in the form of arcuate slots 61 and 62. The slots 61 extend circumferentially of the web 46 and are disposed in an annular row or series with the adjacent ends 61ª and 61ᵇ of each pair of such slots spaced apart and separated by an intervening radial web portion forming a substantially radially extending spoke element 63. The slots 62 likewise extend circumferentially of the web 46 and have their adjacent ends 62ª and 62ᵇ spaced apart by an intervening portion of the connecting web which forms a radially disposed spoke element 64.

The slots 61 and 62 of the two rows are disposed in a circumferentially offset relation so that the ends 61ª and 61ᵇ of each pair of slots of the outer row are spanned by a slot of the inner row, and vice versa, the ends 62ª and 62ᵇ of the slots of the inner row are spanned by slots of the outer row. By reason of this circumferentially offset or staggered relation of the slots 61 and 62 of the adjacent rows, the radial spoke portions 63 and 64 of the connecting web 46 will likewise be in a circumferentially offset relation with the result that any flux passing directly from one to the other of the pole ring portions 44 and 45 will be required to follow a circuitous or a zigzag path and will be required to flow through a cross-sectional area of magnetic material which is relatively small as represented by the cross-sectional area of the spoke portions 63 and 64 and by the cross-sectional area of the intervening arcuate connecting finger portions 66 of the web which lie between the slots 61 and 62 of the adjacent rows.

The annular pole member 15, as described above, can be readily produced as a one-piece metal member and the slots 61 and 62 can be formed in the connecting web 46 by punching, or by any other suitable fabricating procedure or apparatus. The connecting web 46 will accordingly have the desired high magnetic reluctance which has been explained above and the coupling 10 will be of maximum effectiveness for driving or braking purposes with minimum wattage expenditure in the coil 17.

FIG. 3 of the drawings shows a magnetic coupling 70 which is generally similar to the coupling 10 described above but in which provision has been made for a flow of cooling air through the device for carrying away excess heat. Since the modified coupling 70 corresponds generally with the above-described coupling 10, the corresponding parts have been designated by the same reference characters.

In the modified coupling 70 the axial projections or flanges 71 and 72 of the inner and outer pole ring portions 44 and 45 of the pole member 15 are of a somewhat different shape and are disposed in an outside overlapping or telecoping relation to the walls 23 and 24 of the core member 16. The inner flange 71 also serves as a connecting means for connecting the outer rim portion 35 of the pole member 15 with its supporting hub 36.

The inner flange 71 of the pole member 15 includes an inclined annular portion 71ª which is disposed at a substantially 45° inclination to the common axis of the shaft members 13 and 14 and is provided with a row of circumferentially spaced openings 74 which communicate with the annular chamber 52. The outer flange 72 of the pole member 15 likewise includes an inclined annular connecting portion 72ª which is here shown as being disposed in a substantially 45° angular relation to the common rotation axis. This inclined connecting portion 72ª is provided with an annular row of circumferentially spaced openings 75 which also communicate with the annular chamber 52. The inclined annular connecting portions 71ª and 72ª are in a diverging axial relation with respect to the core member 16.

The portion of the chamber 52 which is not occupied by the coil 17 provides a radial annular air passage in the field unit 11 and the rows of openings 74 and 75 form inlet and outlet openings or connections for this air passage. During the operation of the coupling 70, cooling air will flow into the passage 52 through the inlet openings 74 and will be discharged from the passage through the outlet openings 75 and this flow of air through the field unit will be assisted by centrifugal action and will be effective in carrying away excess heat. The air which thus flows through the field unit 11 is supplied to the passage 52 from the inner space or chamber 76 of the device which is in communication with the atmosphere through various crevices and spaces existing between the various parts of the device.

From the foregoing description and the accompanying drawings it will now be readily understood that this invention provides a magnetic coupling usable as a clutch or the like and which embodies an annular pole member of a one-piece construction such that this member will be very strong and rigid and can be manufactured rapidly and economically, and in which a high-reluctance connecting means between the inner and outer pole ring portions and formed as an integral part thereof will reduce to a minimum the leakage flow of flux therebetween through such connecting means. It will now also be readily understood that this invention provides such a magnetic coupling with novel air passage means for accommodating a cooling flow of air through the device and that such air-cooling of the coupling is achieved with no great increase in the cost of the device.

Although the magnetic couplings of this invention and the integral pole members thereof have been illustrated and described herein to a somewhat detailed extent, it will be understood, of course, that the invention is not regarded as being limited correspondingly in scope but includes all changes and modifications coming within the terms of the claims hereof.

Having described my invention, I claim:

1. In a magnetic coupling or the like; a one-piece annular pole member having substantially radially spaced inner and outer pole ring portions and integral annular web means extending radially and circumferentially between said ring portions and connecting the same at an intermediate point of the axial length thereof; annular armature means on one side of said pole member and movable to engaged and released positions relative to said ring portions; said armature means being spaced from said web means when in said engaged position; said pole member and armature means being relatively rotatable; said ring portions and said web means defining on one side of the latter an annular recess in said pole member; friction material in said recess; an annular core member on the other side of said pole member and disposed in a spanning and magnetic flux conducting relation to said ring portions; said web means having radially spaced annular rows of circumferentially spaced slots therein with the slots of one row disposed in a staggered relation to slots of an adjacent row and said web means having a high reluctance by reason of the presence of said slots therein; said core member defining with said pole member an annular chamber on the other side of said web means; and energizing coil means occupying a portion of said chamber and another portion of said chamber forming an air passage for a flow of cooling air through the coupling substantially radially thereof; said ring portions having openings therein on radially opposite sides of said other portion of said chamber and forming air inlet and outlet means for said passage.

2. In a magnetic coupling or the like; a group of coaxial members comprising an annular core member, an annular armature member, and an annular pole member disposed between said core member and armature member and having pole portions presented toward said armature member; said armature member and pole member being relatively rotatable and said armature member being shiftable to coupled and uncoupled positions relative to said pole member; said pole member being a one-piece member comprising radially spaced annular wall portions and an annular web wall extending in an annularly coextensive relation between and substantially rigidly connecting said wall portions; and energizing coil means associated with said core member and pole member for producing flux linkage of said armature member with said pole member through a main flux path loop extending through said wall portions and around said web wall; said web wall having high-reluctance areas in a circumferentially spaced annular series relation for limiting flux leakage through said web wall; annular portions of said web wall lying on radially opposite sides of said areas being integrally joined in an uninterrupted relation with said annular wall portions.

3. A magnetic coupling or the like as defined in claim 2 wherein said high-reluctance areas are spaced openings in said web wall whereby the magnetic conductivity of said web wall is limited primarily to portions thereof remaining between said openings.

4. A magnetic coupling or the like as defined in claim 2 wherein said high-reluctance areas comprise circumferentially extending slots in annular series in said web wall whereby the magnetic conductivity of said web wall is limited primarily to spoke portions thereof remaining between the adjacent ends of said slots.

5. A magnetic coupling or the like as defined in claim 4 wherein said slots comprise at least two radially spaced rows of said circumferentially extending slots disposed so that the spoke portions remaining between the adjacent ends of the slots of one row lie substantially radially opposite the intermediate portions of the slots of an adjacent row.

6. In a magnetic coupling or the like; a group of coaxial members comprising an annular core member, an annular armature member, and an annular pole member disposed between said core member and armature member and having pole portions presented toward said armature member; said armature member and pole member being relatively rotatable and said armature member being shiftable to coupled and uncoupled positions relative to said pole member; said pole member comprising radially spaced annular wall portions extending into adjacent co-operative relation to said core member, and an annular web means connecting said wall portions; said core member and pole member defining therebetween an annular chamber; and energizing coil means associated with said core member and located in a portion of said chamber for producing flux linkage of said armature member with said pole member through a main flux path loop extending through said wall portions and around said web means; said web means having high-reluctance areas for limiting flux leakage through said web means; another portion of said chamber providing an air passage, and said wall portions having openings located on radially opposite sides of said other chamber portion and being in communication with said passage for a flow of cooling air through the coupling in a generally radial direction so as to be assisted by centrifugal force.

7. In a magnetic coupling or the like; magnetic circuit means having an energizing coil thereon and including a rotatable annular pole structure, and a rotatable armature member adjacent said pole structure and shiftable to coupled and uncoupled positions relative to the latter in response to energization and de-energization of said coil; said pole structure comprising spaced coaxial outer and inner annular walls forming portions of a main flux path loop extending through said circuit means for linking co-operation with said armature member, and a radial annular web wall means connecting said annular walls and lying inside said loop; said web wall means having spaced high-reluctance areas for limiting flux leakage through said web wall means; said circuit means having an annular space therein providing an air passage, and said annular walls having openings disposed with their axes inclined relative to the plane of said web wall means and communicating with said passage on radially opposite sides thereof for a flow of cooling air through the coupling in a generally radial direction so as to be assisted by centrifugal force.

8. In a magnetic coupling or the like; a rotatable annular armature member; an annular core member having a channel recess containing an energizing coil and spaced outer and inner annular portions forming side walls of said channel recess and extending toward said armature member; and a pole member having pole portions presented toward said armature member and relative to which said armature member is shiftable to coupled and uncoupled positions in response to energization and de-energization of said coil; said pole member comprising spaced outer and inner annular walls extending away from said armature member, and a substantially radial annular connecting means connecting said annular walls; the adjacent ends of said side walls and said annular walls being in axially overlapped relation so that said core member, portions of said pole member and portions of said armature member define a main flux path loop extending around said connecting means and coil; said connecting means having high-reluctance areas and spoke portions between said areas whereby the magnetic conductivity of said connecting means is limited primarily to said spoke portions thereof; said core member and pole member defining therebetween an annular passage means, and certain of the walls of the two members comprising said core member and pole member having openings therein in communication with said passage means on radially opposite sides thereof for a flow of cooling air through the coupling in a generally radial direction so as to be assisted by centrifugal force.

References Cited in the file of this patent

UNITED STATES PATENTS

| | | |
|---|---|---|
| 1,446,225 | Thompson | Feb. 20, 1923 |
| 1,746,365 | Schunemann | Feb. 11, 1930 |
| 2,267,114 | Lear et al. | Dec. 23, 1941 |
| 2,739,684 | Meyer | Mar. 27, 1956 |
| 2,884,107 | Frankel | Apr. 28, 1959 |
| 2,919,776 | Pierce | Jan. 5, 1960 |
| 2,919,777 | Walter | Jan. 5, 1960 |

FOREIGN PATENTS

| | | |
|---|---|---|
| 709,869 | Germany | Aug. 28, 1941 |